(12) United States Patent
Baeumler et al.

(10) Patent No.: US 9,624,989 B2
(45) Date of Patent: Apr. 18, 2017

(54) FREEWHEEL AND FREEWHEEL ARRANGEMENT

(71) Applicant: BorgWarner Inc., Auburn Hills, MI (US)

(72) Inventors: Richard Baeumler, Brunnen (DE); Erwin Josef Lipp, Speyer (DE); Dirk Achim Schmitt, Leimen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/520,771

(22) Filed: Oct. 22, 2014

(65) Prior Publication Data
US 2015/0114783 A1 Apr. 30, 2015

(30) Foreign Application Priority Data
Oct. 24, 2013 (DE) .................. 10 2013 017 825

(51) Int. Cl.
*F16D 41/06* (2006.01)
*F16D 41/066* (2006.01)
*F02N 15/02* (2006.01)
*F16D 41/067* (2006.01)

(52) U.S. Cl.
CPC ......... *F16D 41/066* (2013.01); *F02N 15/023* (2013.01); *F16D 41/067* (2013.01); *F16D 2041/0665* (2013.01)

(58) Field of Classification Search
CPC ...... F16D 41/06; F16D 41/064; F16D 41/066; F16D 2041/0605; F16D 2041/0665
See application file for complete search history.

(56) References Cited

U.S. PATENT DOCUMENTS

| | | | | |
|---|---|---|---|---|
| 2,902,125 A | * | 9/1959 | House | F02N 15/023 192/45.019 |
| 4,735,299 A | * | 4/1988 | Ohuchi | F16D 41/066 192/45.008 |
| 4,819,775 A | * | 4/1989 | Witt | F16D 41/07 192/41 A |
| 5,573,094 A | * | 11/1996 | Roberts | F16D 41/061 192/41 R |
| 6,161,668 A | * | 12/2000 | Le Calve | F16D 41/07 192/41 A |
| 8,511,186 B2 | * | 8/2013 | Ono | C23C 8/26 74/7 C |

(Continued)

FOREIGN PATENT DOCUMENTS

BE WO 0168942 A1 * 9/2001 ............... C21D 8/06

*Primary Examiner* — Richard Lorence
*Assistant Examiner* — David Morris
(74) *Attorney, Agent, or Firm* — BrooksGroup (57) ABSTRACT

A freewheel (4) having a first running ring (28), a second running ring (30), a clamping gap (32) formed between the first and second running rings (28, 30), and at least one clamping element (34) in the clamping gap (32), the clamping gap (32) being assigned a side wall (40; 52) on which the at least one clamping element (34) can be or is supported. A side (60; 64) of the clamping element (34) which faces toward the side wall (40; 52) and/or that side (68; 72) of the side wall (40; 52) which faces toward the clamping element (34) is provided with a friction-reducing, wear-reducing and/or corrosion-reducing coating (62, 66; 70, 74) or surface treatment.

19 Claims, 6 Drawing Sheets

(56) References Cited

U.S. PATENT DOCUMENTS

| | | | |
|---|---|---|---|
| 2003/0154658 A1* | 8/2003 | Salmon | B24D 5/02 |
| | | | 51/307 |
| 2013/0060437 A1* | 3/2013 | Bogner | B60L 3/0061 |
| | | | 701/67 |
| 2014/0178637 A1* | 6/2014 | Rajagopalan | C23C 28/044 |
| | | | 428/141 |

* cited by examiner

FREEWHEEL AND FREEWHEEL ARRANGEMENT

CROSS-REFERENCE TO RELATED APPLICATIONS

This application claims the benefit of German Patent Application No. 102013017825.8 filed Oct. 24, 2013, the disclosure of which is herein incorporated by reference in its entirety.

The present invention relates to a freewheel having a first running ring, a second running ring, a clamping gap formed between the first and second running rings, and at least one clamping element in the clamping gap, the clamping gap being assigned a side wall on which the at least one clamping element can be or is supported. The present invention furthermore relates to a freewheel arrangement in a drivetrain, having a freewheel of said type.

Freewheel arrangements, which have a freewheel, in the drivetrain of a motor vehicle are known from the prior art. The known freewheels have a first running ring, a second running ring, a clamping gap formed between the first and second running rings, and at least one clamping element in the clamping gap. The clamping gap is assigned a side wall on which the at least one clamping element can be or is supported. A first torque-transmitting element is connected rotationally conjointly to the first running ring, wherein the first torque-transmitting element is connected in terms of rotational drive to the output side of a drive unit. By contrast, a second torque-transmitting element is connected rotationally conjointly to the second running ring, wherein the second torque-transmitting element is connected in terms of rotational drive to an output side of a starter. Within a freewheel arrangement of said type, the output side of the starter may be permanently connected in terms of rotational drive to the second torque-transmitting element, especially since the first running ring, which is connected in terms of rotational drive to the output side of the drive unit, is decoupled from the second running ring, which is connected in terms of rotational drive to the output side of the starter, as soon as the rotational speed of the first running ring is higher than the rotational speed of the second running ring, which can be attributed to the increased rotational speed of the output side of the drive unit after the drive unit has been started with the aid of the starter.

The known freewheels within the freewheel arrangements in a drivetrain of a motor vehicle have basically proven successful, but the freewheels exhibit significant hysteresis characteristics, that is to say a relatively large difference between a release or lift-off rotational speed, which is encountered as the speed of the output side of the drive unit rises and at which the first and second running rings are decoupled, and a clamping or re-engagement rotational speed, which is encountered as the speed of the output side of the drive unit decreases and at which the first and second running rings are coupled to one another again by the at least one clamping element.

It is therefore an object of the present invention to provide a freewheel which exhibits less pronounced hysteresis characteristics. The present invention is furthermore based on the object of providing a freewheel arrangement in a drivetrain, preferably in the drivetrain of a motor vehicle, which has an advantageous freewheel of said type.

Said object is achieved by means of the features specified in claims 1 and 10 hereof. The subclaims relate to advantageous embodiments of the invention.

The inventive freewheel has a first running ring, a second running ring, a clamping gap formed between the first and second running rings, and at least one clamping element within the clamping gap. The two running rings may for example be in a radially nested arrangement, such that they can also be referred to as an outer ring and an inner ring. The first and/or second running ring is preferably in the form of an annular disk-shaped sheet-metal part or sheet-metal molded part in order to ensure a small axial structural space requirement of the freewheel. The clamping element may basically have any desired outer contour, although it is preferable for the clamping element to have a circular outer contour and to consequently be in the form of a clamping roller. The clamping gap is assigned a side wall on which the at least one clamping element can be or is supported. Even though the term "side wall" is always used here, this expression also generally encompasses a side part on which the at least one clamping element can be or is supported. To reduce the axial structural space requirement, the side wall is preferably in the form of a sheet-metal part or sheet-metal molded part, which is if appropriate of annular disk-shaped form. According to the invention, that side of the clamping element which faces toward the side wall and/or that side of the side wall which faces toward the clamping element is provided with a friction-reducing, wear-reducing and/or corrosion-reducing coating. Here, as a coating, use may be made of any layer which is suitable for reducing the friction between clamping element and side wall, the wear to the clamping element or to the side wall, and/or the corrosion on the clamping element or on the side wall. By way of example, reference is made here to coatings in the form of known hard material layers, the layer material of which may comprise or consist of, for example, TiAlN, AlTiN, TiAlSiN, AlCrN, AlCrSiN, TiN, TiCN, CrN, $TiB_2$, $Al_2O_3$ or TiAlN+C. Furthermore, as a coating, use may be made of a carbon layer, for example a plasma polymer layer, an amorphous carbon layer or a crystalline carbon layer. The coating has the advantage that the friction between the clamping element and the side wall is reduced, which can be achieved for example by means of the relatively low surface roughness of the friction partners. This ultimately has the result that the release or lift-off rotational speed mentioned in the introduction and the clamping or re-engagement rotational speed differ to a lesser extent, such that the hysteresis characteristics of the freewheel are improved. Furthermore, the wear and/or corrosion on the clamping element or on the side wall is reduced, which not only increases the service life of the freewheel but also improves the hysteresis characteristics. As an alternative to the friction-reducing, wear-reducing and/or corrosion-reducing coating, that side of the clamping element which faces toward the side wall and/or that side of the side wall which faces toward the clamping element may be subjected to surface treatment in order to obtain a friction-reducing, wear-reducing and/or corrosion-reducing action. Here, use may be made of all known surface treatment methods which have a corresponding effect on the friction between clamping element and side wall, the wear to the clamping element or to the side wall, and/or the corrosion on the clamping element or on the side wall. At this juncture, reference is made, by way of example, to polishing or grinding methods by means of which the surface roughness can be reduced. Also included here, however, are surface modification methods in which particles of foreign substance are introduced into the surface boundary zone of a substrate, in this case of the clamping element or of the side wall, in order to obtain the friction-reducing, wear-reducing and/or corrosion-reducing action.

As surface modification methods, use is preferably made of nitriding, particularly preferably plasma nitriding, gas nitriding or bath nitriding, if appropriate with subsequent oxidization.

In one advantageous embodiment of the freewheel according to the invention, a spring element is provided for preloading the clamping element into a predetermined position. Accordingly, the clamping element may be preloaded by means of the spring element for example into a clamping position in which the clamping element prevents a rotation of the first running ring relative to the second running ring in a first circumferential direction, wherein the clamping element can be moved counter to the restoring force of the spring element into a release position, in which the first running ring is rotatable relative to the second running ring in an opposite, second circumferential direction.

To improve the hysteresis characteristics of the freewheel, it is provided in a preferred embodiment of the freewheel according to the invention that the spring element can be or is supported on the coating or on the surface-treated side of the side wall. Alternatively or in addition, the spring element has a friction-reducing, wear-reducing and/or corrosion-reducing coating on its side facing toward the side wall, or was subjected to surface treatment so as to obtain a reduction of the friction between spring element and side wall, a reduction of the wear to the spring element and/or to the side wall, and/or a reduction of the corrosion on the spring element and/or on the side wall. With regard to the coating or the surface treatment, reference is made to the statements made above, which can be applied correspondingly.

In a particularly preferred embodiment of the freewheel according to the invention, the spring element—similarly to a helical spring—has an elongate spring body. The elongate spring body is however not helically coiled, and instead, the elongate spring body runs in a radial plane, that is to say in a plane spanned by the radial directions of the freewheel, wherein the elongate spring body has a profile which undulates in a radial direction. It could also be said that the spring body has an undulating profile in the direction of the mutually opposite or radially nested running rings. Accordingly, the elongate spring body may for example have a profile which undulates or is zigzag-shaped in a radial direction, wherein in this case the elongate spring body runs in the radial plane. By virtue of the fact that the elongate spring body runs in the radial plane, said spring body is particularly suitable for use within a clamping gap which has a particularly small extent or width with regard to the axial direction. It is consequently possible, owing to the elongate spring body of the spring element running in the radial plane, to provide a freewheel that has a particularly small axial structural length. Furthermore, the profile of the elongate spring body which undulates in the radial direction makes it possible for the spring element to have a significantly greater extent in the radial direction than in the axial direction. Consequently, a spring element of said type is suitable for extending over a major part of the width in the axial direction and substantially over the entire height of the clamping gap in the radial direction, and thus substantially filling the clamping gap. This has the advantage that a clamping element designed correspondingly to the clamping gap can be supported particular securely on the spring element without it being necessary in this regard to implement further measures, such as is necessary for example in the case of a spring element in the form of a helical spring which has the same extent in the axial direction and in the radial direction, and which is consequently not suitable for filling the height of a relatively narrow clamping gap. This also makes it easier for the spring element to be attached to, fastened to or supported on the first running ring, the second running ring or the side wall.

In a further advantageous embodiment of the freewheel according to the invention, the spring body is formed by a sheet-metal part or wire. The sheet-metal part may for example be formed by a sheet-metal strip which has an undulating profile in a radial direction, wherein the width direction of the sheet-metal strip in this case preferably corresponds to the axial direction of the freewheel. The wire may for example have a circular cross section, such that a standardized or simple wire can be used for the manufacture of the spring element, thus reducing the outlay in terms of manufacture.

In a further advantageous embodiment of the freewheel according to the invention, the spring body, owing to its profile that undulates in the radial direction, has radially outer undulation peaks and radially inner undulation troughs, between which legs of the spring body may extend. Such legs are preferably of rectilinear form or have a rectilinear profile. In this embodiment, it is preferable for at least two, if appropriate at least three, undulation peaks and at least two, if appropriate three, undulation troughs to be provided.

In a particularly advantageous embodiment of the freewheel according to the invention, the spring body has, with regard to its direction of extent, different widths in the axial direction. In this way, a possible contact area between the side wall and the spring element that is supported on the side wall is reduced, such that the friction between the spring element and side wall is also reduced. This has the result that the hysteresis characteristics of the freewheel are further improved. Moreover, unhindered functioning of the spring element is ensured owing to the reduced friction between spring element and side wall.

In a further advantageous embodiment of the freewheel according to the invention, the spring body is fastened to the first running ring, to the second running ring or to the side wall. Here, to ensure simple assembly and to ensure secure hold of the spring body on the first running ring, on the second running ring or on the side wall, the spring body is preferably fastened to the first running ring, to the second running ring or to the side wall with detent action.

In a further preferred embodiment of the freewheel according to the invention, the first running ring has a first running surface facing toward the clamping element, the second running ring has a second running surface facing toward the clamping element, and the clamping element has an outer contour which can be or is supported on the first and second running surfaces. Here, it is preferable for the first running surface, the second running surface and/or the outer contour to be provided with a wear-reducing and/or corrosion-reducing coating. Alternatively or in addition, the first running surface, the second running surface and/or the outer contour may be subjected to surface treatment in order to reduce the wear to the first running surface, to the second running surface and/or to the outer contour and/or in order to reduce the corrosion on the first running surface, on the second running surface and/or on the outer contour. With regard to the possible coating or surface treatment, reference is made to the statements made above, which can preferably be applied correspondingly.

In a further preferred embodiment of the freewheel according to the invention, the clamping element is in the form of a clamping roller. In this context, a clamping roller is to be understood in particular to mean a clamping element with a circular circumference or a circular outer contour.

Here, the ratio between a width and an outer diameter of the clamping roller is preferably equal to or less than 1:2 or 1:3, particularly preferably equal to or less than 1:4, if appropriate equal to or less than 1:5. This has the advantage that a freewheel can be provided which has a small axial structural length, especially since the clamping roller of such dimensions itself has a relatively small axial extent, such that the clamping gap can also have a correspondingly small extent in the axial direction. Moreover, clamping rollers of such dimensions have a relatively large side that can be supported on the side wall, such that the above-mentioned coating or surface treatment of the clamping element and/or of the side wall is particularly important in order to positively influence the resulting relatively pronounced hysteresis characteristics. Also, the above-mentioned spring element with the elongate spring body which runs in a radial plane and which has a profile which undulates in the radial direction is brought to bear with particular effect, especially since only a spring body designed correspondingly is capable of securely supporting the clamping element and of being accommodated in an effective manner within the clamping gap dimensioned correspondingly to the clamping element.

As already explained in the introduction, as a coating on the sides of the clamping element and on the side wall, use may basically be made of any coating which has a friction-reducing, wear-reducing and/or corrosion-reducing action. Correspondingly, as a coating on the outer contour of the clamping element, on the first running surface and/or on the second running surface, use may be made of any coating which has a wear-reducing and/or corrosion-reducing action. In a further particularly advantageous embodiment of the freewheel according to the invention, the coating is a carbon layer, especially since this has a positive effect in particular with regard to friction and wear. A carbon layer is to be understood in particular to mean layers whose predominant constituent is carbon. As a carbon layer, use is made, for example, of a plasma polymer layer, an amorphous carbon layer or a crystalline carbon layer. In this connection, a coating formed by an amorphous carbon layer has proven to be particularly advantageous. Amorphous carbon layers are often also referred to as DLC (Diamond-Like Carbon) layers. Accordingly, in the case of the freewheel according to the invention, use is made, for example, of coatings in the form of a hydrogen-free amorphous carbon layer (a-C), of a tetrahedral hydrogen-free amorphous carbon layer (ta-C), of a metal-containing, hydrogen-free amorphous carbon layer (a-C:Me), of a hydrogen-containing amorphous carbon layer (a-C:H), of a tetrahedral hydrogen-containing carbon layer (ta-C:H), of a metal-containing, hydrogen-containing amorphous carbon layer (a-C:H:Me) and of a modified hydrogen-containing amorphous carbon layer (a-C:H:X), wherein the metal (Me) may for example be titanium (Ti), and the modification (X) may for example be silicon (Si) or oxygen (O).

In a further advantageous embodiment of the freewheel according to the invention, the coating has a layer thickness of between 1 µm and 5 µm. The stated layer thickness has proven to be adequate in view of the loading of the surface that occurs in the freewheel, wherein it may by all means be adequate for the layer thickness to be less than 3 µm, as is also preferable.

To ensure secure adhesion of the coating to the respective body, that is to say for example to the clamping element, to the side wall, to the first or to the second running ring, it is provided in a further preferred embodiment of the freewheel according to the invention that the coating is applied with the interposition of at least one intermediate layer composed of a layer material that differs from the layer material of the coating itself.

In a further particularly preferred embodiment of the freewheel according to the invention, the coating is applied to the respective component of the freewheel by physical gas phase deposition, that is to say a so-called PVD (physical vapor deposition) method or by chemical gas phase deposition, that is to say a CVD (chemical vapor deposition) method. This also includes application methods which constitute a mixture of physical and chemical gas phase deposition.

To enable a torque to be transmitted from or to the first and second running rings, the freewheel, in a further advantageous embodiment thereof, has a first and a second torque-transmitting element. Accordingly, the first torque-transmitting element is connected rotationally conjointly to the first running ring in order to permit a transmission of torque between an output side of a drive unit and the first running ring. Alternatively or in addition, the second torque-transmitting element is connected rotationally conjointly to the second running ring in order to permit a transmission of torque between an output side of a starter and the second running ring. The first and/or second torque-transmitting element is preferably a sheet-metal part or sheet-metal molded part, if appropriate of annular disk-shaped form, in order, owing to the thin-walled nature of a sheet-metal part or sheet-metal molded part, to obtain a particularly small axial structural length of the freewheel and nevertheless be able to transmit relatively high torques. Moreover, the manufacturing process is simplified through the use of sheet-metal parts or sheet-metal molded parts. The first torque-transmitting element is preferably in the form of a flex plate, which is suitable for compensating for an axial displacement and/or a wobbling movement between the output side of the drive unit and the first running ring. By contrast to this, however, it is also possible for the first torque-transmitting element to be formed by a flywheel, which is then preferably in the form of a cast part and/or turned part. Owing to the connection of the second running ring to the output side of the starter via the second torque-transmitting element, the second torque-transmitting element may also be referred to as starter wheel. Accordingly, the second torque-transmitting element may in particular be formed substantially by the above-mentioned, if appropriate annular disk-shaped, sheet-metal part or sheet-metal molded part, to which a toothed ring of the starter is fastened.

In a further particularly advantageous embodiment of the freewheel according to the invention, the side wall on which the clamping element can be or is supported is formed separately from the first and second torque-transmitting elements. In this context, a side wall formed separately from the first and second torque-transmitting elements is to be understood to mean a side wall which has not been formed in one piece with the first and second torque-transmitting elements, and which has at most been fastened retroactively to one of the two torque-transmitting elements. This has the advantage that a side wall is provided which, during the course of the manufacturing process, can initially be coated or subjected to surface treatment independently of the torque-transmitting elements, before the side wall is then subsequently joined to the further constituent parts of the freewheel. The manufacturing process is simplified considerably in this way. To obtain a particularly small axial structural length of the freewheel despite the side wall being formed separately from the first and second torque-transmitting elements, it is provided in this embodiment that the side wall is preferably in the form of an annular disk or annular disk-shaped sheet-metal part or sheet-metal molded part.

In contrast to the embodiment described above, it is provided in a further advantageous embodiment of the freewheel according to the invention that the side wall is formed in one piece with the first or second torque-transmitting element. This embodiment may be advantageous in particular if it is not intended for the side wall itself to have a coating and/or to be subjected to surface treatment.

In a further particularly preferred embodiment of the freewheel according to the invention, the clamping gap is assigned both the above-mentioned side wall and also a further side wall, that is to say two side walls, on which the at least one clamping element can be or is supported in mutually opposite directions. The statements made above regarding the former side wall can be applied correspondingly to the further side wall. Both side walls are preferably connected rotationally conjointly to only one of the two running rings, that is to say either to the first running ring or to the second running ring. It is furthermore preferable for the two side walls to be formed separately from the running ring, that is to say not in one piece with the latter.

In a further particularly advantageous embodiment of the freewheel according to the invention, the two side walls on which the at least one clamping element can be or is supported in mutually opposite directions are formed separately from the first and second torque-transmitting elements. Consequently, the two side walls are not formed in one piece either with the first torque-transmitting element or with the second torque-transmitting element, and are at most fastened to one of the torque-transmitting elements. With regard to the advantages, reference is made to the description above. It is also the case in the present embodiment that the two side walls are preferably each in the form of an annular disk or annular disk-shaped sheet-metal part or sheet-metal molded part.

The freewheel arrangement according to the invention in a drivetrain has a freewheel of the above-described type according to the invention.

In a preferred embodiment of the freewheel arrangement according to the invention, the freewheel is in the form of a dry-running freewheel. In other words, the clamping elements are arranged in a clamping gap which is not filled with a coolant and/or lubricant such as, for example, oil or grease. Owing to the above-mentioned coating or surface treatment, a freewheel is nevertheless provided which exhibits particularly low wear and which has improved hysteresis characteristics, although it is pointed out that the coating or surface treatment also realizes corresponding advantages in the case of freewheel arrangements whose freewheel is in the form of a wet-running freewheel.

In a further advantageous embodiment of the freewheel arrangement according to the invention, the second torque-transmitting element of the freewheel is permanently connected in terms of rotational drive to the output side of the starter.

In a particularly preferred embodiment of the freewheel arrangement according to the invention, the second running ring is supported on the output side of the drive unit, or on a static housing, via a radial bearing, wherein the static housing may for example be the housing of the drive unit. As a radial bearing, use is made, for example, of a rolling bearing, which may moreover be sealed. It has however proven to be advantageous for the radial bearing to be in the form of a plain bearing, wherein the plain bearing should particularly preferably be in the form of a dry plain bearing or dry-running plain bearing. Here, the plain bearing may for example be in the form of a sealed plain bearing. It has furthermore proven to be advantageous for at least one of the sliding partners of the plain bearing to be formed by a coating, wherein, with regard to said coating, reference is made to the possible coating types mentioned above. The coating may for example be provided on that side of the second running ring which faces away from the clamping gap.

In a further preferred embodiment of the freewheel arrangement according to the invention, the second running ring is supported indirectly or directly on the output side of the drive unit. In the case of indirect support, the support is realized via the plain bearing and via the first torque-transmitting element or a freewheel hub provided on the first torque-transmitting element.

The invention will be explained in more detail below on the basis of exemplary embodiments and with reference to the appended drawings. In the drawings.

Figure 1:
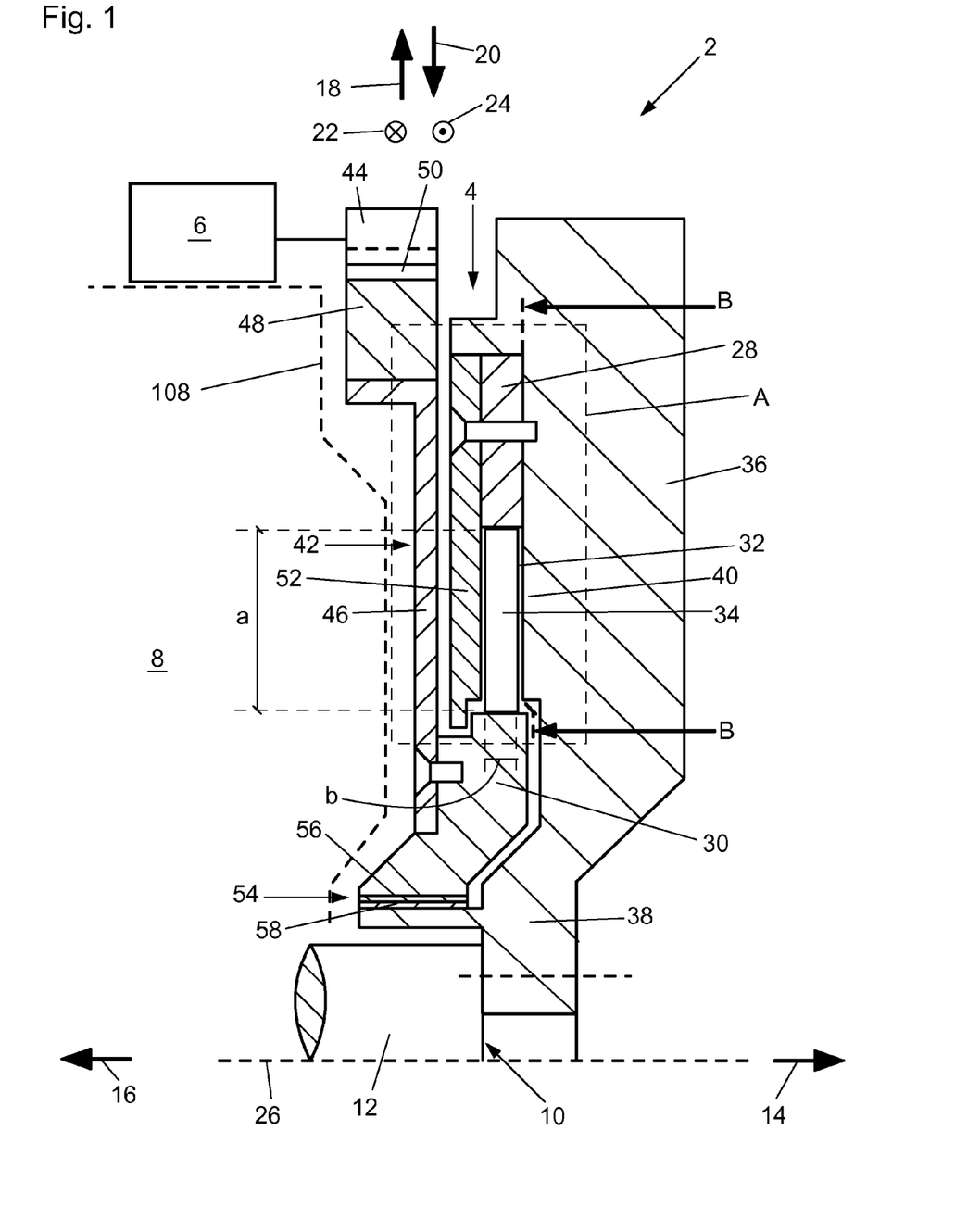
FIG. 1 shows a partial side view of a freewheel arrangement having a first embodiment of the freewheel according to the invention in a partially sectional illustration.

FIG. 1 shows a freewheel arrangement 2 within a drivetrain of a motor vehicle. The freewheel arrangement 2 substantially has a freewheel 4, a starter 6, which is merely schematically indicated in FIG. 1, and a drive unit 8, the output side 10 of which is formed by an output shaft 12. The drive unit 8 may for example be an internal combustion engine.

The Figures indicate, by means of corresponding arrows, the mutually opposite axial directions 14, 16, the mutually opposite radial directions 18, 20, and the mutually opposite circumferential directions 22 and 24 of the freewheel arrangement 2 and of the freewheel 4, wherein the circumferential direction 22 will hereinafter be referred to as first circumferential direction 22 and the circumferential direction 24 will hereinafter be referred to as second circumferential direction 24. The axis of rotation 26 of the output side 10 of the drive unit 8 and of the freewheel 4 extends in the axial directions 14, 16. The first and second circumferential directions 22, 24 may also be referred to as first and second directions of rotation.

The freewheel 4 has a first running ring 28 and a second running ring 30. As can be seen from FIG. 1, the first running ring 28 is in the form of an outer ring arranged outside the second running ring 30 as viewed in the radial direction 18, such that the second running ring 30 can also be referred to as an inner ring. The two running rings 28, 30 are in a nested arrangement in the radial direction 18, 20, such that a clamping gap 32 which extends continuously around in the circumferential direction 22, 24 is formed between the first and second running rings 28, 30. At least one clamping element 34 is arranged within the clamping gap 32.

The freewheel 4 furthermore has a first torque-transmitting element 36 which is connected rotationally conjointly to the first running ring 28 and which, in the first embodiment illustrated, is in the form of a flywheel. The first torque-transmitting element 36 is, by way of its hub which will hereinafter also be referred to as freewheel hub 38, connected rotationally conjointly to the output side 10, or more precisely to the output shaft 12, of the drive unit 8, and extends outward in the radial direction 18 in order to be connected rotationally conjointly to the first running ring 28 in the form of outer ring. The first torque-transmitting element 36, in the form of a flywheel, is in this case formed as a cast part and/or turned part. The first torque-transmitting element 36 likewise forms a first side wall 40 which is assigned to the clamping gap 32 so as to delimit the clamping gap 32 in the axial direction 14.

Furthermore, a second torque-transmitting element 42 is provided which is connected rotationally conjointly to the second running ring 30 and which serves for the transmission of torque between an output side 44 of the starter 6 and the second running ring 30. The second torque-transmitting element 42 has an inner section which is formed by a sheet-metal part or sheet-metal molded part 46, wherein the sheet-metal part or sheet-metal molded part 46 is, at the inside in the radial direction 20, fastened rotationally conjointly to the second running ring 30. Furthermore, the second torque-transmitting element 42 has a toothed ring 48 fastened to the outside of the sheet-metal part or sheet-metal molded part 46 as viewed in the radial direction 18, which toothed ring is formed so as to extend continuously around in the circumferential direction 22, 24. At its side pointing outward in the radial direction 18, the toothed ring 48 has a toothing 50 or similar rotary drive contour which is permanently connected or engaged in terms of rotational drive with the output side 44 of the starter 6. For this purpose, the output side 44 may for example be formed by a pinion. It can thus firstly be stated that the second torque-transmitting element 42 is permanently connected in terms of rotational drive to the output side 44 of the starter 6. By contrast to the illustration in FIG. 1, the toothed ring 48 or the toothing 50 thereof may also be formed in one piece with the sheet-metal part or sheet-metal molded part 46. The second torque-transmitting element 42 may also be formed integrally with the running ring 30. The second torque-transmitting element 42 may also be referred to as a starter wheel.

The second torque-transmitting element 42 or starter wheel however does not directly delimit the clamping gap 32 in the axial direction 16. Rather, the clamping gap 32 is assigned a second side wall 52, which delimits the clamping gap 32 in the axial direction 16. In the first embodiment shown in FIG. 1, the second side wall 52, by contrast to the first side wall 40, is not formed in one piece with the first torque-transmitting element 36 or with the second torque-transmitting element 42. Rather, the second side wall 52 is formed separately from the first and second torque-transmitting elements 36, 42. Here, the second side wall 52 is in the form of an annular disk or annular disk-shaped sheet-metal part or sheet-metal molded part and is fastened rotationally conjointly to the first running ring 28 and to the first torque-transmitting element 36, wherein, as indicated in FIG. 1, said fastening may be performed by means of rivets or screws, or alternatively by welding. The clamping gap 32 is thus assigned two side walls, specifically the first side wall 40 and the second side wall 52, wherein the clamping element 34 can be or is supported on the first side wall 40 in the axial direction 14 and on the second side wall 52 in the opposite axial direction 16.

The second running ring 30 is supported on the output side 10 of the drive unit 8, in the form of the output shaft 12, in the radial direction 18, 20 via a radial bearing 54. Here, in the embodiment illustrated, the support on the output side 10, in the form of the output shaft 12, is realized indirectly via the first torque-transmitting element 36 or via the freewheel hub 38, which in this case is formed in one piece with the first torque-transmitting element 36. Alternatively, the support on the output side 10, in the form of the output shaft 12, may also be realized directly by way of the radial bearing 54. In the embodiment illustrated, the radial bearing 54 is in the form of a dry plain bearing, wherein the two sliding partners 56, 58, or at least one of the sliding partners 56, 58, are/is formed by a coating on the second running ring 30 and/or on the first torque-transmitting element 36 or on the freewheel hub 38 thereof. Also, the freewheel 4 itself is in the form of a dry-running freewheel, that is to say no coolant and/or lubricant, such as for example oil or grease, is provided at least within the clamping gap 32.

The clamping element 34 is in the form of a clamping roller and has a width b in the axial direction 14, 16 and has an outer diameter a. The width b mentioned here and the outer diameter a mentioned here preferably relate to the overall extent of the clamping element 34, that is to say include any coating that may be provided on the clamping element 34. The ratio between the width b and the outer diameter a of the clamping element 34 in the form of a clamping roller is equal to or less than 1:2 or 1:3, preferably equal to or less than 1:4, particularly preferably equal to or less than 1:5. Said clamping element can thus also be referred to as a circular disk-shaped or coin-shaped clamping element 34.

Figure 2:
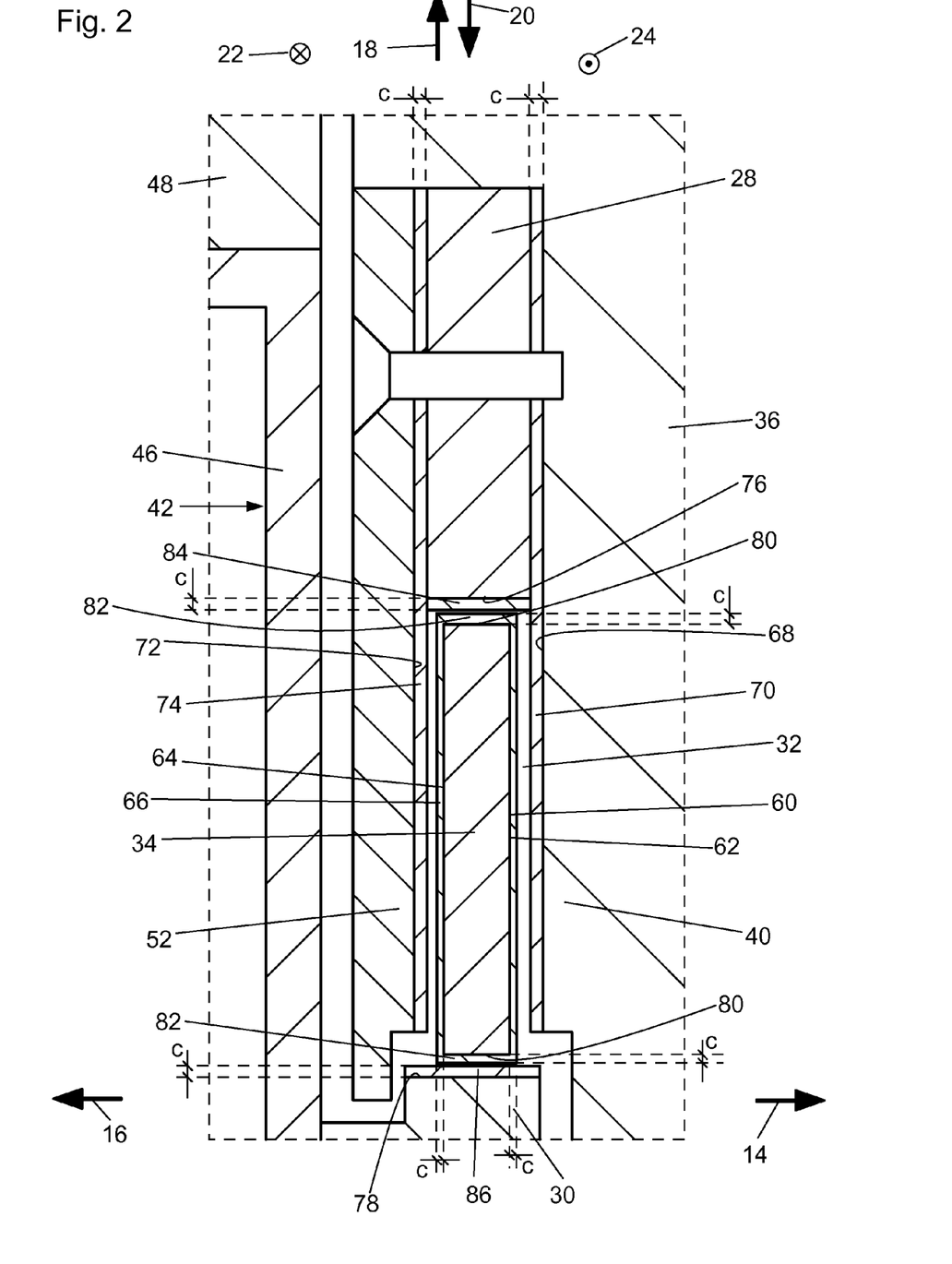
FIG. 2 shows an enlarged illustration of the detail A from FIG. 1.

As illustrated in FIG. 2, which shows an enlarged detail A from FIG. 1, the first side 60, which faces toward the first side wall 40 and points in the axial direction 14, of the clamping element 34 is provided with a friction-reducing, wear-reducing and/or corrosion-reducing coating 62, such that the clamping element 34 can be or is supported indirectly via its coating 62 on the first side wall 40 in the axial direction 14. Correspondingly, a second side 64, which faces toward the second side wall 52 and points in the axial direction 16, of the clamping element 34 has a friction-reducing, wear-reducing and/or corrosion-reducing coating 66, such that the clamping element 34 can be or is supported indirectly via the coating 66 on the second side wall 52 in the axial direction 16.

Furthermore, that side 68 of the first side wall 40 which faces toward the clamping element 34 is provided with a friction-reducing, wear-reducing and/or corrosion-reducing coating 70, such that the clamping element 34 can be supported indirectly via the coating 70 on the side 68 of the first side wall 40 in the axial direction 14. Correspondingly, that side 72 of the second side wall 52 which faces toward the clamping element 34 and which points in the axial direction 14 is provided with a friction-reducing, wear-reducing and/or corrosion-reducing coating 74, such that the clamping element 34 can be or is supported indirectly via the coating 74 on the second side wall 52 in the axial direction 16.

Accordingly, in the embodiment illustrated, it is always the case that two coatings make contact with one another, specifically the coating 62 and the coating 70 on the one hand, and the coating 66 and the coating 74 on the other hand, wherein it is alternatively also basically possible for one of the two coatings to be omitted. It is accordingly possible for the coating 62 to be omitted in favor of the coating 70, or vice versa. It is likewise possible for the coating 66 to be omitted in favor of the coating 74, and vice versa.

The first running ring 28 has a first running surface 76 which faces toward the clamping element 34 and which points inward in the radial direction 20, whereas the second running ring 30 has a second running surface 78 which faces toward the clamping element 34 and which points outward in the radial direction 18. By contrast, the clamping element 34 has an outer contour 80 which can be or is supported on the first and second running surfaces 76, 78, wherein, in the embodiment illustrated, the outer contour 80 cannot be or is not supported on the first and second running surfaces 76, 78 directly. Rather, the outer contour 80 of the clamping element 34 is provided with a wear-reducing and/or corrosion-reducing coating 82, such that the clamping element 34 or the outer contour 80 thereof can be or is, via the coating 82, supported indirectly on the first running surface 76 in the radial direction 18 and on the second running surface 78 in the radial direction 20.

The first and second running surfaces 76, 78 are also each provided with a wear-reducing and/or corrosion-reducing coating 84 and/or 86, such that, in this case too, the clamping element 34 is supported on the running surfaces 76, 78 indirectly via the coatings 84 and 86. The coating 82 of the clamping element 34 may be dispensed with in favor of the coatings 84, 86, and vice versa. Since the clamping element 34 is however a relatively small component, it should have both the coatings 62, 66 and the coating 82 such that the clamping element 34 has a continuous coating over its entire surface.

The coatings 62, 66, 70, 74, 82, 84, 86 mentioned here and the coatings that form at least one of the sliding partners 56, 58 may basically be any coating for reducing friction, wear and/or corrosion, that is to say for example also classic hard material layers. It is however preferable for the coatings to be formed in each case by a carbon layer, for example a plasma polymer layer, an amorphous carbon layer or a crystalline carbon layer. Here, the amorphous carbon layer, also referred to as DLC layer, has proven to be particularly advantageous, wherein the layer thicknesses c should be between 1 μm in 5 μm. Here, even layer thicknesses c of less than 3 μm can achieve the desired effect. Furthermore, the coatings mentioned here are preferably applied to the respective component by a physical vapor deposition method (PVD method) or a chemical vapor deposition method (CVD method). It has also proven to be advantageous for the respective coating to be applied to the respective component with the interposition of at least one intermediate layer composed of a layer material that differs from the layer material of the coating itself, wherein, for clarity, the intermediate layer has not been illustrated.

Figure 3:
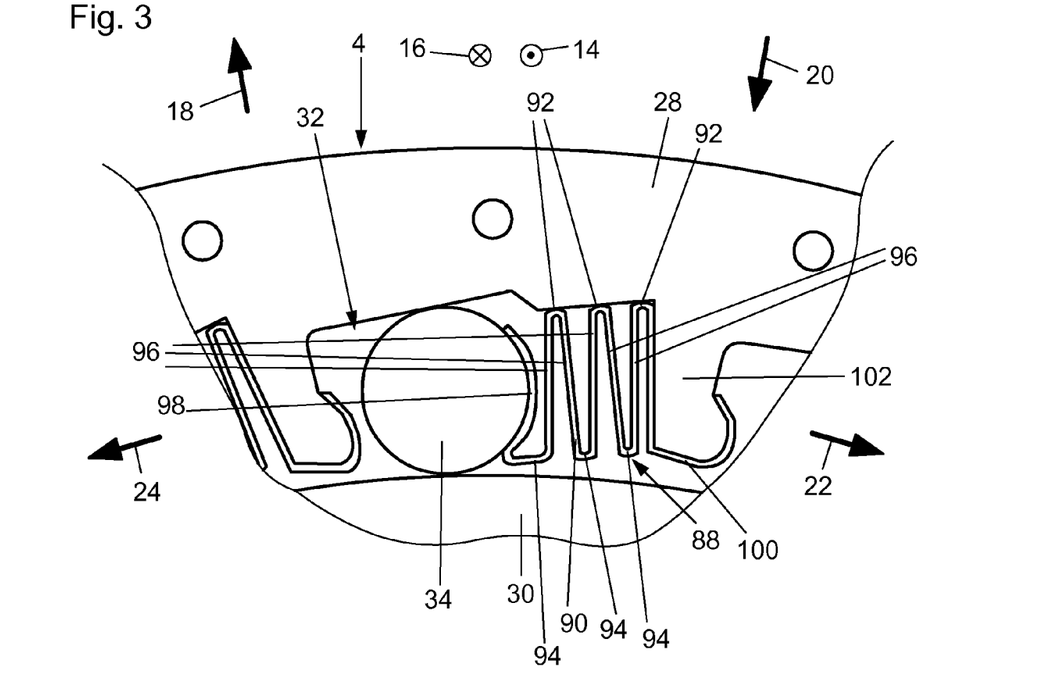
FIG. 3 shows a view along the section line B-B in FIG. 1.
Figure 5:
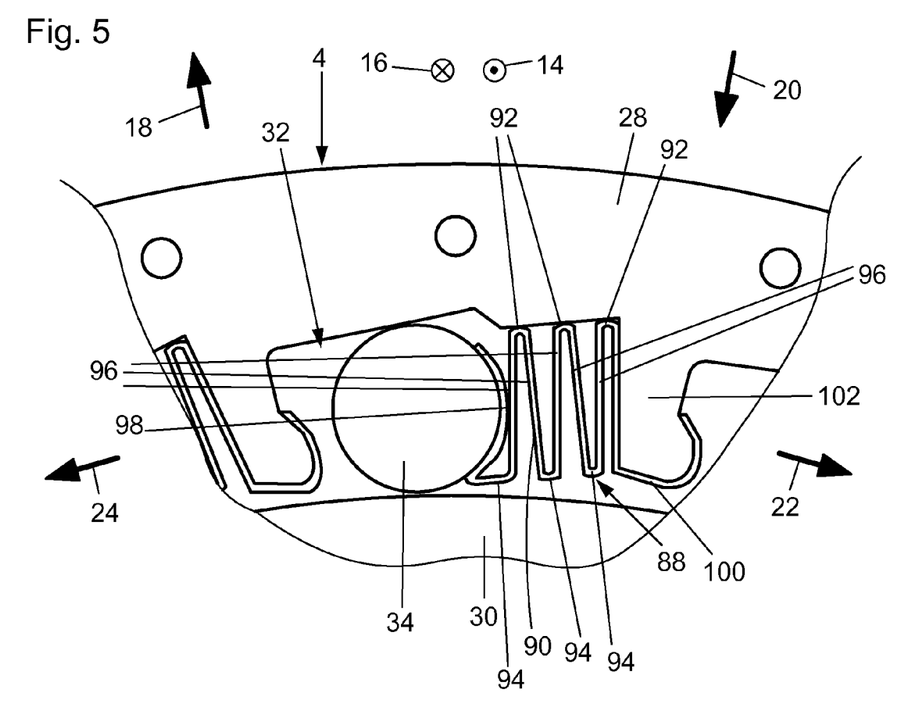
FIG. 5 shows the freewheel from FIGS. 2 and 3 with the clamping element in the release position.

As can be seen from FIG. 3, each of the clamping elements 34 is assigned a respective spring element 88 for preloading the clamping element 34 into a predetermined position relative to the first running ring 28, which is in the form of an outer ring. In the present example, the spring element 88 serves for preloading the clamping element 34 into the clamping position shown in FIG. 3. The clamping elements 34 can each be moved counter to the restoring force of the spring element 88 from the clamping position as per FIG. 3, in which the clamping element 34 prevents a rotation of the first running ring 28 relative to the second running ring 30 in the first circumferential direction 22, into a release position shown in FIG. 5, in which the first running ring 28 can rotate relative to the second running ring 30 in the opposite, second circumferential direction 24. Consequently, the freewheel 4 illustrated here is, in terms of basic construction, a so-called one-way clutch. Here, the respective clamping element 34 is preloaded into the narrowing clamping gap 32 in the circumferential direction 24 by means of the spring element 88.

The spring element 88 has an elongate spring body 90. The elongate spring body 90 is, as can be seen in particular from FIG. 4, in the form of a sheet-metal part, in this case in the form of an elongate sheet-metal strip. However, as an alternative to the sheet-metal part or sheet-metal strip, a wire may also be used as a spring body 90. By contrast to a helical spring, whose spring body, usually a wire, is helically coiled, the elongate spring body 90 of the spring element 88 runs in a radial plane spanned by the radial directions 18, 20, wherein the spring body 90 has a profile which undulates in the radial direction 18, 20. Here, the width direction of the sheet-metal strip used as spring body 90 in the present embodiment corresponds substantially to the axial directions 14, 16.

Figure 4:
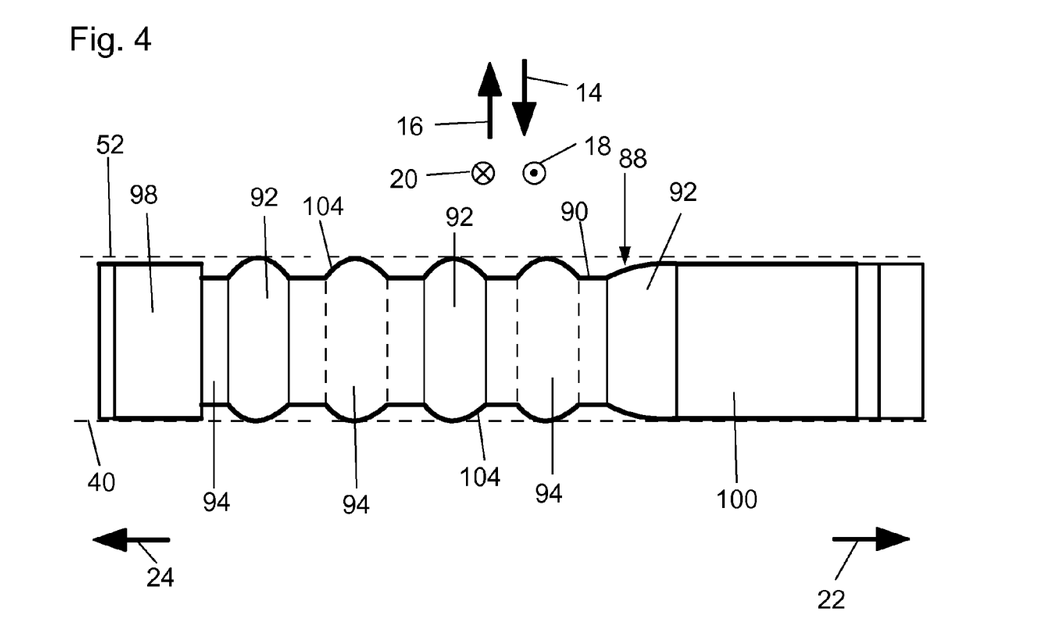
FIG. 4 shows a plan view of the spring body from FIG. 3 on its own and in an enlarged illustration.

Owing to its profile which undulates in the radial direction 18, 20, the spring body 90 has radially outer undulation peaks 92 and radially inner undulation troughs 94, between which legs 96 of the elongate spring body 90 extend, said legs preferably running rectilinearly. The legs 96 are consequently arranged substantially in alignment with one another in the circumferential direction 22, 24. The radially outer undulation peaks 92 can be or are supported outwardly in the radial direction 18 on the first running ring 28 or on the inner side of the latter, whereas the radially inner undulation troughs 94 are preferably spaced apart in the radial direction 18, 20 from the second running ring 30 or from the outer side of the latter.

The spring body 90 furthermore has a supporting section 98, which faces toward the clamping element 34 and on which the clamping element 34 can be or is supported, and a fastening section 100, which faces away from the clamping element 34. The fastening section 100, which is of substantially U-shaped form, serves for the fastening of the spring body 90 or of the spring element 88 to the first running ring 28 with detent action, said running ring for this purpose having a projection 102 which protrudes into the clamping gap 32 in the radial direction 20. The fastening section 100 engages behind the projection 102 with clamping or detent action both in the circumferential directions 22, 24 and also in the radial directions 18, 20 in order to realize secure fastening of the spring element 88 to the first running ring 28. Alternatively, the fastening section 100 of the spring element 88 or of the spring body 90 may also be fastened with detent action to the second running ring 30 or to one of the two side walls 40, 52, wherein a corresponding projection 102 which protrudes into the clamping gap 32 could then be provided on the second running ring 30, on the first side wall 40 or on the second side wall 52.

As can be seen from FIG. 4, the spring body 90 has different widths in the axial direction 14, 16 as viewed over its direction of extent. Accordingly, in the embodiment illustrated, the undulation peaks 92, the undulation troughs 94, the fastening section 100 and the supporting section 98 have a greater width in the axial direction 14, 16 than the legs 96. In this way, the contact area between the spring element 88 or the spring body 90 and the side walls 40 and 52 indicated in FIG. 4, against which the spring element 88 can be or is supported in the axial directions 14 and 16, is reduced, resulting in reduced friction. Here, the spring element 88 or the spring body 90 thereof can be or is supported in the axial direction 14 against the coating 70 of the first side wall 40 and in the axial direction 16 against the coating 74 of the second side wall 52 in order that the friction between the spring element 88 and the side walls 40, 52, and any associated wear, is also reduced. Alternatively or in addition, the spring element 88 or the spring body 90 thereof may be provided, on its side which faces toward the first side wall 40 and which points in the axial direction 14, with a friction-reducing, wear-reducing and/or corrosion-reducing coating 104, wherein that side of the spring element 88 or of the spring body 90 which faces toward the second side wall 52 may also be provided with a friction-reducing, wear-reducing and/or corrosion-reducing coating 106. The coating 104, 106 may in this case for example be restricted to the widened sections of the spring body 90. Since the spring elements 88 or the spring bodies 90 are however relatively small components, it may be advantageous for the spring body 90 to be provided in its entirety with a corresponding coating 104, 106.

Figure 6:
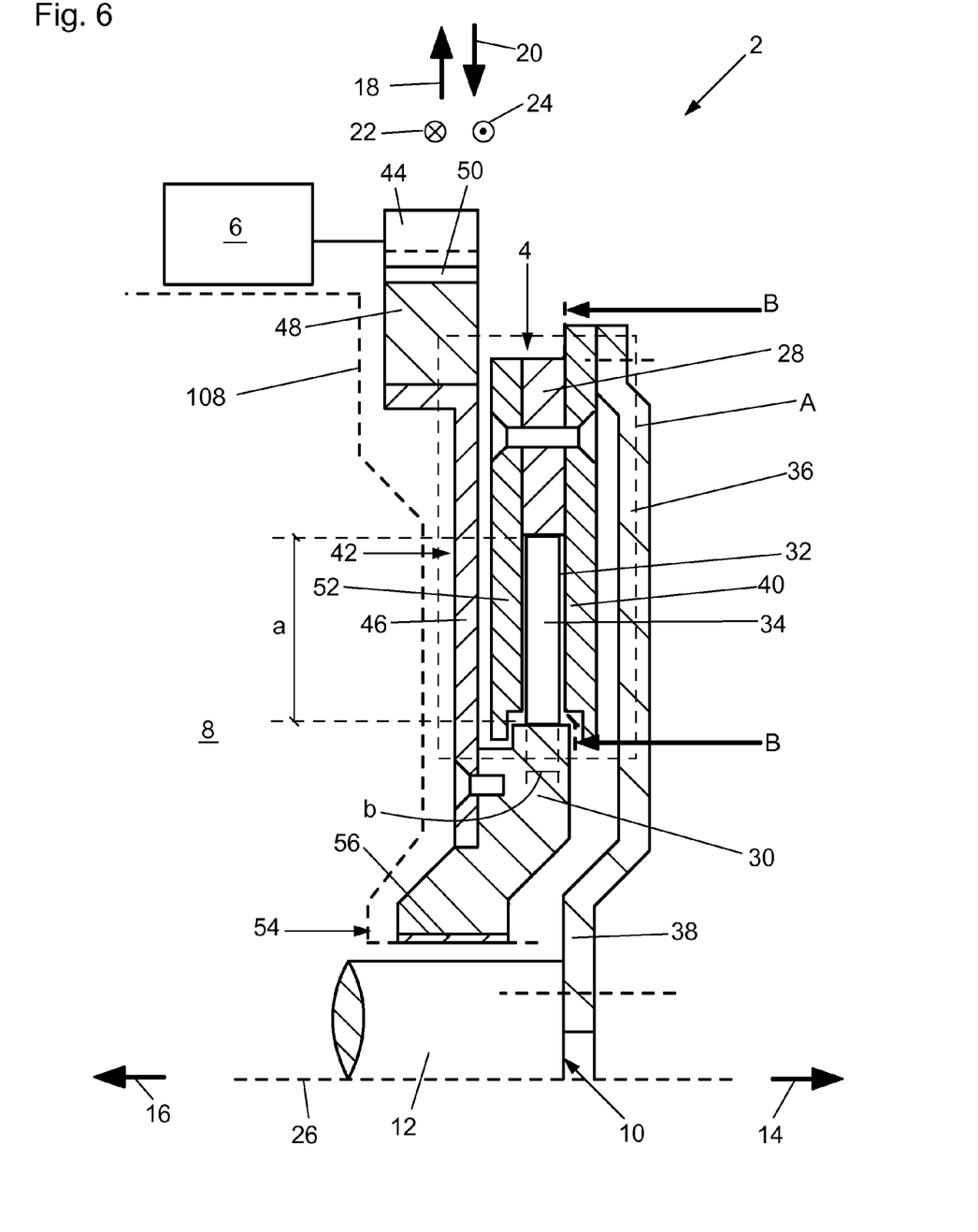
FIG. 6 shows a partial side view of a freewheel arrangement having a second embodiment of the freewheel according to the invention in a partially sectional illustration.
Figure 7:
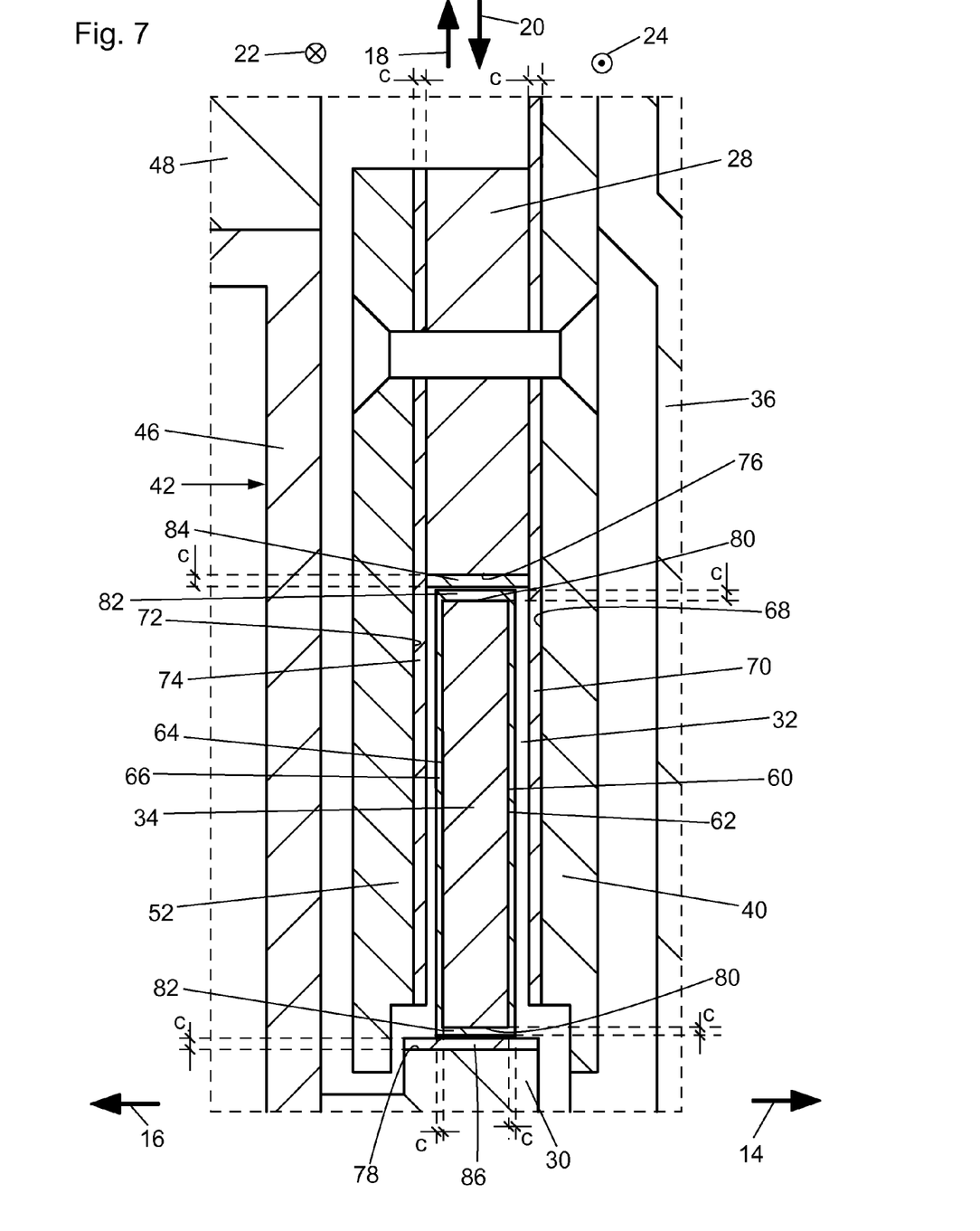
FIG. 7 shows an enlarged illustration of the detail A from FIG. 6.

FIGS. 6 and 7 show a freewheel arrangement 2 having a second embodiment of the freewheel 4 according to the invention, wherein only the differences will be discussed below, the same reference signs are used for identical or similar parts, and the above description of FIGS. 1 to 5 otherwise applies correspondingly.

In the case of the second embodiment as per FIGS. 6 and 7, not only the second side wall 52 but also the first side wall 40 is formed separately both from the first torque-transmitting element 36 and also from the second torque-transmitting element 42. In other words, the first side wall 40 is not formed in one piece with the first torque-transmitting element 30 or in one piece with the second torque-transmitting element 42, and is instead fastened rotationally conjointly to the first torque-transmitting element 36 retroactively. In the second embodiment, the first side wall 40 is also, like the second side wall 52, in the form of an annular disk or annular disk-shaped sheet-metal part or sheet-metal molded part, in order to realize a freewheel 4 which has a small axial structural length and which, moreover, can be manufactured in a particularly simple manner, especially as the side walls 40, 52 formed as sheet-metal parts or sheet-metal molded parts can be molded and/or punched from a metal sheet in a relatively simple manner. Also, in both embodiments, it has proven to be advantageous for the first running ring 28 to also be in the form of an annular disk or annular disk-shaped sheet-metal part or sheet-metal molded part, which can subsequently be connected rotationally conjointly to the two side walls 40, 52 in a simple manner.

In the second embodiment, the first side wall 40 is thus no longer formed by the first torque-transmitting element 36. Also, the first torque-transmitting element 36 is formed no longer by a flywheel but by a sheet-metal part or sheet-metal molded part, although it would basically also be possible for the first torque-transmitting element 36 to be formed as a flywheel in the second embodiment too. In the second embodiment illustrated, the first torque-transmitting element 36 is however in the form of a so-called flex plate, such that it is capable of compensating for any displacement or wobbling movement between the output side 10 or the output shaft 12 of the drive unit 8, on the one hand, and the freewheel 4, on the other hand.

In the second embodiment, too, the second running ring 30 is supported in the radial direction 18, 20 via the radial bearing 54 which is in the form of a dry plain bearing, but in the illustrated second embodiment, the support is realized on a section of a static housing 108 which is indicated in the Figures by dashed lines and which, in the embodiment illustrated, is formed by a housing of the drive unit 8.

Even though the embodiments described above with reference to FIGS. 1 to 7 are described only with reference to coatings, it is possible, instead of the coatings 62, 66, 70, 74, 82, 84, 86 and the coating that forms at least one of the sliding partners 56, 58, for the corresponding components to also be subjected to surface treatments for friction reduction, wear reduction or corrosion reduction, by means of which surface treatments the surfaces or surface boundary layers of the respective component are modified. The above description of the embodiments with reference to FIGS. 1 to 7 otherwise applies correspondingly to freewheels 4 and freewheel arrangements 2 that have been subjected to corresponding surface treatment.

LIST OF REFERENCE SIGNS

2 Freewheel arrangement
4 Freewheel
6 Starter
8 Drive unit
10 Output side
12 Output shaft
14 Axial direction
16 Axial direction
18 Radial direction
20 Radial direction
22 First circumferential direction
26 Second circumferential direction
26 Axis of rotation
28 First running ring
30 Second running ring
32 Clamping gap
34 Clamping element
36 First torque-transmitting element
38 Freewheel hub
40 First side wall
42 Second torque-transmitting element
44 Output side
46 Sheet-metal part or sheet-metal molded part
48 Toothed ring
50 Toothing
52 Second side wall
54 Radial bearing
56 Sliding partner
58 Sliding partner
60 First side
62 Coating
64 Second side
66 Coating
68 Side
70 Coating
72 Side
74 Coating
76 First running surface
78 Second running surface
80 Outer contour
82 Coating
84 Coating
86 Coating
88 Spring element
90 Spring body
92 Undulation peaks
94 Undulation troughs
96 Leg
98 Support section
100 Fastening section
102 Projection
104 Coating
106 Coating
108 Static housing
a Outer diameter b Width
c Layer thickness

What is claimed is:

1. A freewheel arrangement comprising a freewheel having a first running ring, a second running ring, a clamping gap formed between the first and second running rings, the first running ring defining an outer side of the clamping gap, the second running ring defining an inner side of the clamping gap opposite the outer side, and at least one clamping element in the clamping gap that has a clamping element side, a side wall defining an axial side of the clamping gap that extends from the inner side to the outer side delimiting the clamping gap, and on which the at least one clamping element is supported, wherein the clamping element side faces toward the side wall and wherein each of the clamping element side and the axial side is provided with a layer treated to reduce hysteresis of the freewheel wherein contact between the clamping element and the side wall is through contact of the two respective layers on the clamping element side and the axial side.

2. The freewheel arrangement as claimed in claim 1, wherein a spring element is provided for preloading the clamping element into a predetermined position, the spring element being supportable on the side wall, wherein the spring element has a spring element side facing the side wall, and a friction-reducing treatment provided on the spring element, only on the spring element side.

3. The freewheel arrangement as claimed in claim 2, wherein the spring element has an elongate spring body which runs in a radial plane and which has a profile which undulates in a radial direction, which spring body is formed by a sheet-metal part or wire, the spring body having radially outer undulation peaks and radially inner undulation troughs, with legs between each adjacent outer undulation peak and inner undulation trough, wherein the outer undulating peaks and the inner undulating troughs have a first width and the legs have a second width and wherein the first width is greater than the second width so that the outer undulating peaks and the inner undulating troughs contact the axial side and the legs do not contact the axial side.

4. The freewheel arrangement as claimed in claim 3, wherein the spring body is fastened with detent action, to the first running ring, to the second running ring or to the side wall, through a fastening section of the spring element, wherein a projection protrudes into the clamping gap and the fastening section has a U-shape that engages on an outside of the projection including on an opposite side of the projection from the spring body.

5. The freewheel arrangement as claimed in claim 1, wherein the first running ring has a first running surface facing toward the clamping element, the second running ring has a second running surface facing toward the clamping element, and the clamping element has an outer contour which is engageable between the first and second running surfaces, and wherein the first running surface, the second running surface and the outer contour each has a layer treated to reduce hysteresis of the freewheel.

6. The freewheel arrangement as claimed in claim 1, wherein the clamping element is in the form of a clamping roller, the ratio between a width (b) and an outer diameter (a) of the clamping roller being equal to or less than 1:5.

7. The freewheel arrangement as claimed in claim 1, wherein the layer comprises amorphous carbon and has a thickness (c) of between 1 µm in 5 µm, and is applied with at least one other material that differs from the amorphous carbon.

8. The freewheel arrangement as claimed in claim 1, comprising a drive unit that comprises an internal combustion engine, a starter selectively driving a second torque transmitting element to drive the drive unit through the freewheel, wherein a first torque-transmitting element, which is connected rotationally conjointly to the first running ring is provided for transmitting torque between an output side of the drive unit and the first running ring, and a second torque-transmitting element, which is connected rotationally conjointly to the second running ring is provided for transmitting torque between an output side of the starter and the second running ring, the side wall being connected with the first torque-transmitting element and comprising a second side wall defining a second axial side of the clamping gap opposite the side wall, and the second side wall extending from the inner side to the outer side and delimiting the clamping gap, and the side wall and the second side wall each fixed to the first running ring.

9. The freewheel arrangement as claimed in claim 1, comprising first and second torque-transmitting elements connected to the freewheel, a second side wall defining a second axial side of the clamping gap opposite the side wall wherein the at least one clamping element is supported in mutually opposite directions by the side wall and the second side wall, both side walls being formed separately from the first and second torque-transmitting elements, as an annular disk.

10. The freewheel arrangement as claimed in claim 1, which comprises a dry-running freewheel, and a drivetrain including a drive unit and a starter, the freewheel arrangement comprising a torque-transmitting element that is fixed with the second running ring and is permanently connected in terms of rotational drive to an output side of the starter and the torque transmitting element is intermittently connected to the drive unit through the freewheel.

11. The freewheel arrangement as claimed in claim 10, wherein the second running ring is supported on an output side of the drive unit via a radial bearing.

12. The freewheel arrangement as claimed in claim 1, comprising a drive unit, and a starter, wherein the freewheel is connected between the drive unit and the starter, comprising a first torque-transmitting element, which is connected rotationally conjointly to the first running ring and which is provided for transmitting torque between an output side of the drive unit and the first running ring, and a second torque-transmitting element, which is connected rotationally conjointly to the second running ring and which is provided for transmitting torque between an output side of the starter and the second running ring, the side wall being formed as an annular disk integrally with the first or second torque-transmitting element.

13. A freewheel arrangement comprising a first running ring, a second running ring, a clamping gap formed between the first and second running rings, and at least one clamping element positioned in the clamping gap, the clamping element coupling the first running ring to the second running ring in a first relative rotational state of the first and second running rings, and decoupling the first running ring from the second running ring in a second relative rotational state of the first and second running rings, wherein a release rotational speed of the first running ring relative to the second running ring is encountered as the first and second running rings are decoupled via disengagement of the at least one clamping element, and a clamping rotational speed is encountered when the first and second running rings are coupled to one another by the at least one clamping element, and comprising a side wall delimiting the clamping gap and extending from the first running ring to the second running ring, and the clamping element has a clamping element side facing the side wall and a layer is provided on at least one of the clamping element side or the side wall which provides a reduced difference between the release rotational speed and the clamping rotational speed by the layer effecting an eased coupling of the first and second running rings through the at least one clamping element and comprising a drive unit that comprises an internal combustion engine, a starter selectively driving the drive unit through the freewheel, a first torque transmitting element fixed to rotate with the drive unit and the first running ring, a second torque transmitting element fixed to rotate with the starter and the second running ring, a second side wall delimiting the clamping gap opposite the side wall and the second side wall extending from the first running ring to the second running ring, the second side wall disposed between the second torque transmitting element and the first and second running rings, and the side wall formed by the first torque transmitting element and disposed between the first and second running rings and the first torque transmitting element, the first and second side walls fixed to rotate with the first torque transmitting element.

14. The freewheel arrangement as claimed in claim 13 comprising a second side wall delimiting the clamping gap opposite the side wall and the second side wall extending from the first running ring to the second running ring, and the layer is also provided on the second side wall.

15. The freewheel arrangement as claimed in claim 13 comprising toothing on the second torque transmitting element and a pinion fixed to the starter, wherein the toothing and the pinion are permanently rotationally engaged.

16. A freewheel comprising a first running ring, a second running ring, a clamping gap formed between the first and second running rings, and at least one clamping element positioned in the clamping gap, the clamping element coupling the first running ring to the second running ring in a first relative rotational state of the first and second running rings, and decoupling the first running ring from the second running ring in a second relative rotational state of the first and second running rings, wherein a release rotational speed of the first running ring relative to the second running ring is encountered as the first and second running rings are decoupled via disengagement of the at least one clamping element, and a clamping rotational speed is encountered when the first and second running rings are coupled to one another by the at least one clamping element, and comprising a side wall delimiting the clamping gap and extending from the first running ring to the second running ring, and the clamping element has a clamping element side facing the side wall and a layer is provided on at least one of the clamping element side or the side wall which provides a reduced difference between the release rotational speed and the clamping rotational speed by the layer effecting an eased coupling of the first and second running rings through the at least one clamping element, and comprising a spring element preloading the clamping element into a predetermined position, the spring element supportable on the side wall, wherein the spring element has a spring element side facing the side wall, and a friction-reducing treatment is provided on the spring element side.

17. The freewheel as claimed in claim 16, wherein the spring element has an elongate spring body that has radially outer undulation peaks and radially inner undulation troughs, with legs between each adjacent outer undulation peak and inner undulation trough, wherein the outer undulating peaks and the inner undulating troughs have a first width and the legs have a second width, and wherein the first width is greater than the second width so that the outer undulating peaks and the inner undulating troughs contact the side wall and the legs do not contact the side wall.

18. The freewheel as claimed in claim 17, wherein the spring body is fastened with detent action, to the first running ring through a fastening section of the spring element, wherein a projection protrudes into the clamping gap from the first running ring, and the fastening section has a U-shape that engages on an outside of the projection including on an opposite side of the projection from the spring body.

19. A freewheel arrangement comprising a first running ring, a second running ring, a clamping gap formed between the first and second running rings, and at least one clamping element positioned in the clamping gap, the clamping element coupling the first running ring to the second running ring in a first relative rotational state of the first and second running rings, and decoupling the first running ring from the second running ring in a second relative rotational state of the first and second running rings, wherein a release rotational speed of the first running ring relative to the second running ring is encountered as the first and second running rings are decoupled via disengagement of the at least one clamping element, and a clamping rotational speed is encountered when the first and second running rings are coupled to one another by the at least one clamping element, and comprising a side wall delimiting the clamping gap and extending from the first running ring to the second running ring, and the clamping element has a clamping element side facing the side wall and a layer is provided on at least one of the clamping element side or the side wall which provides a reduced difference between the release rotational speed and the clamping rotational speed by the layer effecting an eased coupling of the first and second running rings through the at least one clamping element and comprising a drive unit, a starter selectively driving the drive unit through the freewheel, a first torque transmitting element fixed to rotate with the drive unit and the first running ring, a second torque transmitting element fixed to rotate with the starter and the second running ring, a second side wall delimiting the clamping gap opposite the side wall and the second side wall extending from the first running ring to the second running ring, the second side wall disposed between the second torque transmitting element and the first and second running rings, and the side wall formed by the first torque transmitting element and disposed between the first and second running rings, the first torque transmitting element, and the first and second side walls fixed to rotate with the first torque transmitting element, the second side wall comprising an annular plate and at least one rivet extending through the second side wall and through the first running ring and into first torque transmitting element, the freewheel rotating around an axis that defines an axial direction, with a radial direction defined as extending away from or toward the axis and the second side wall extending radially in toward the axis completely along the clamping gap and having a free terminal inward edge terminating radially inward from the clamping gap and spaced apart from the second torque transmitting element.

* * * * *